United States Patent
Isoda et al.

(10) Patent No.: US 9,577,498 B2
(45) Date of Patent: Feb. 21, 2017

(54) STATOR FOR ROTARY ELECTRIC MACHINE AND METHOD FOR MANUFACTURING THE STATOR

(71) Applicants: Hitoshi Isoda, Chiyoda-ku (JP); Masashi Nakamura, Chiyoda-ku (JP); Shinji Nishimura, Chiyoda-ku (JP)

(72) Inventors: Hitoshi Isoda, Chiyoda-ku (JP); Masashi Nakamura, Chiyoda-ku (JP); Shinji Nishimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 13/753,775

(22) Filed: Jan. 30, 2013

(65) Prior Publication Data
US 2014/0070646 A1 Mar. 13, 2014

(30) Foreign Application Priority Data
Sep. 11, 2012 (JP) .................... 2012-199645

(51) Int. Cl.
*H02K 3/28* (2006.01)
*H02K 3/50* (2006.01)
(Continued)

(52) U.S. Cl.
CPC ............. *H02K 15/02* (2013.01); *H02K 3/28* (2013.01); *H02K 3/325* (2013.01); *H02K 3/50* (2013.01);
(Continued)

(58) Field of Classification Search
CPC ......... H02K 5/225; H02K 3/525; H02K 3/28; H02K 5/22; H02K 3/50; H02K 15/02
(Continued)

(56) References Cited

U.S. PATENT DOCUMENTS 4,714,576 A * 12/1987 Cotton ............... B29C 44/1242
264/262
7,205,689 B2 * 4/2007 Lukenich .................. 310/71
(Continued)

FOREIGN PATENT DOCUMENTS

JP 2009-089456 A 4/2009
JP 4340740 B2 10/2009

OTHER PUBLICATIONS

Japanese Office Action (Preliminary Notice of Reasons for Rejection) dated Oct. 22, 2013, Patent Application No. 2012-199645.

*Primary Examiner* — Tran Nguyen
*Assistant Examiner* — Noli Manaloto
(74) *Attorney, Agent, or Firm* — Sughrue Mion, PLLC; Richard C. Turner

(57) ABSTRACT

Provided is a stator for a rotary electric machine, capable of reducing a space on an end surface of a stator core on an inner diameter side to reduce a size in an axial direction to realize a compact size by maintaining an insulating distance corresponding to a potential difference. In the stator for a rotary electric machine according to the present invention, a coil portion includes a coil main-body portion (21) and a second connecting wire (23). The second connecting wire (23) includes a first bent portion (24) and a second connecting-wire end portion (23A). The second connecting wire (23) is configured so that a differential value of a length z in the axial direction of the stator to a length r in the radial direction of the stator is $\Delta z/\Delta r \geq 0$.

7 Claims, 12 Drawing Sheets

(51) Int. Cl.
*H02K 15/02* (2006.01)
*H02K 15/00* (2006.01)
*H02K 3/32* (2006.01)
*H02K 3/52* (2006.01)

(52) U.S. Cl.
CPC .......... *H02K 3/522* (2013.01); *H02K 15/0056* (2013.01); *H02K 15/0062* (2013.01); *H02K 2203/09* (2013.01); *Y10T 29/49009* (2015.01)

(58) Field of Classification Search
USPC ......... 310/71, 208, 260, 201, 270, 200, 210; 29/596
See application file for complete search history.

(56) References Cited

U.S. PATENT DOCUMENTS

2009/0200888 A1* 8/2009 Tanaka et al. ................ 310/195
2010/0201212 A1* 8/2010 Urano et al. .................... 310/71
2010/0207467 A1* 8/2010 Urano et al. .................... 310/71
2012/0299410 A1* 11/2012 Yoshida et al. ................. 310/71

* cited by examiner

STATOR FOR ROTARY ELECTRIC MACHINE AND METHOD FOR MANUFACTURING THE STATOR

BACKGROUND OF THE INVENTION

1. Field of the Invention

The present invention relates to a stator for a rotary electric machine, including a stator core and a stator winding provided to the stator core, which is configured by electrically connecting a plurality of coil portions formed by winding conductors around teeth to terminal members through connecting wires of the coil portions, and a method for manufacturing the stator.

2. Description of the Related Art

A rotary electric machine used as a driving source of electric automobiles and hybrid automobiles generally includes a ring-shaped stator core which has a plurality of teeth, each projecting in an inner-diameter direction, provided at constant intervals in a circumferential direction. A coil portion formed by winding a conductor is mounted to each of the teeth of the stator core (for example, see Japanese Patent No. 4340740).

For the stator as described above, the coil portions are formed into a unit in advance in accordance with the shapes of the respective teeth so as to facilitate assembly. Then, each of the coil portions is inserted over a corresponding one of the teeth to manufacture the stator.

In this case, after the coil portions are respectively inserted over the teeth, predetermined ones of the coil portions are required to be electrically connected to each other.

The coil portions are connected to each other by connecting a connecting wire of a terminal member provided on the outer diameter side of the stator core and a connecting wire of each of the coil portions on the inner diameter side. Of the two connecting wires, the connecting wire drawn from an innermost diameter portion of a coil main-body portion of the coil portion has a concave bent portion which is recessed in a direction closer to an end surface of the stator core.

The stator for the rotary electric machine described in Japanese Patent No. 4340740 includes the connecting wire having the concave bent portion recessed in the direction closer to the end surface of the stator core. On the inner diameter side of the stator core, however, the connecting wire bulges outward in an axial direction. Therefore, there is a problem in that a space for the bulge is required to be ensured on the end surface of the stator core.

Moreover, a portion of each of the coil portions on the outer diameter side of the stator core is located at a high position as compared with a portion of each of the coil portions on the inner diameter side of the stator core. In addition, the concave bent portion of the connecting wire is formed on the outer diameter side of the stator core.

Therefore, in order to ensure an insulation property between the connecting wires and the coil portions, an insulating distance is required to be ensured on the outer diameter side of the stator core, on which a potential is high. On the inner diameter side of the stator core, on which the connecting wire necessarily bulges outward in the axial direction, the insulating distance becomes longer than needed. Therefore, there is a problem in that the space for providing the connecting wire is required to be increased on the end surface of the stator core.

SUMMARY OF THE INVENTION

The present invention has been made to solve the problems described above and therefore, has an object to provide a stator for a rotary electric machine, which is capable of reducing a space on an end surface of a stator core on an inner diameter side to reduce a size in an axial direction to realize a compact size by maintaining an insulating distance corresponding to a potential difference, and a method for manufacturing the stator.

According to an exemplary embodiment of the present invention, there is provided a stator for a rotary electric machine, including: a stator for a rotary electric machine, comprising: a stator core having a hollow cylindrical shape, including a plurality of slots formed along a circumferential direction by a plurality of teeth, each having a distal end portion projecting to an inner diameter side; and a stator winding provided to the stator core, including a plurality of coil portions, each including a conductor wound around each of the plurality of teeth, electrically connected to each other through terminal members provided on an outer diameter side of an end surface of the stator core. Each of the plurality of coil portions includes: a coil main-body portion; a first connecting wire drawn from an outermost diameter portion of the coil main-body portion; and a second connecting wire drawn from an innermost diameter portion of the coil main-body portion. The first connecting wire includes a first connecting-wire end portion connected to one terminal-member end portion of a corresponding one of the terminal members. The second connecting wire includes a first bent portion formed by bending the second connecting wire outward in a radial direction of the stator core and a second connecting-wire end portion connected to another terminal-member end portion of the corresponding one of the terminal members. The second connecting wire is configured so that a differential value of a length z in an axial direction of the stator (provided that an axially outward direction is a +-direction) to a length r in a radial direction of the stator (provided that a radially outward direction is a +-direction) is $\Delta z/\Delta r \geq 0$.

According to the stator for a rotary electric machine of the present invention, the insulating distance in accordance with the potential difference is ensured between the second connecting wire drawn from the innermost diameter portion of the coil main body portion and the coil main-body portion. As a result, the effects of reducing the space on the end surface of the stator core on the inner diameter side to reduce the size in the axial direction to realize a compact size can be obtained.

DETAILED DESCRIPTION OF THE PREFERRED EMBODIMENTS

Figure 1:
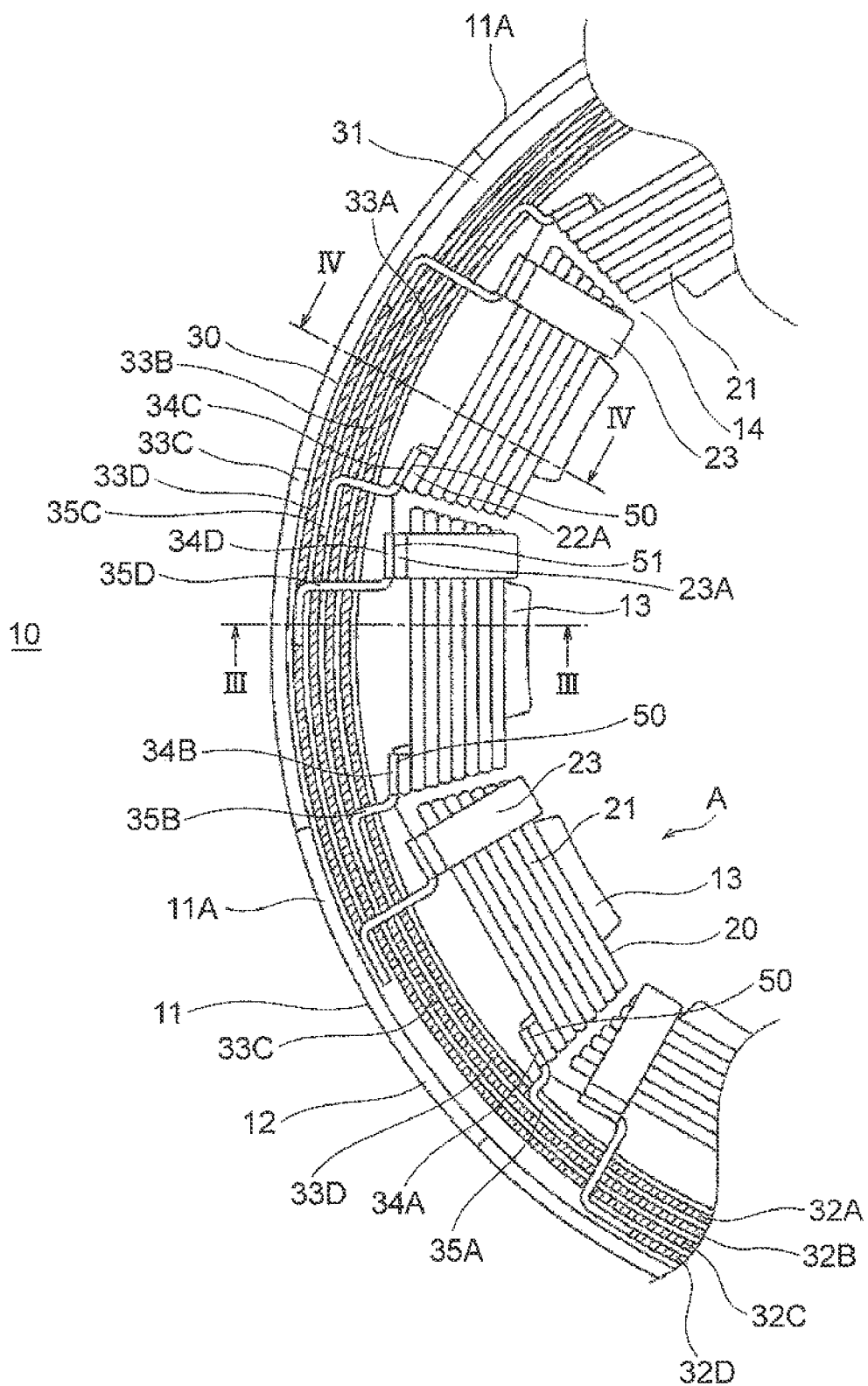
FIG. 1 is a partial plan view illustrating a stator for an electric motor which is a rotary electric machine, according to a first embodiment of the present invention.

Hereinafter, a stator for an electric motor according to each of embodiments of the present invention is described referring to the accompanying drawings. In the drawings, the same or equivalent members or parts are denoted by the same reference symbols for description.

Figure 2:
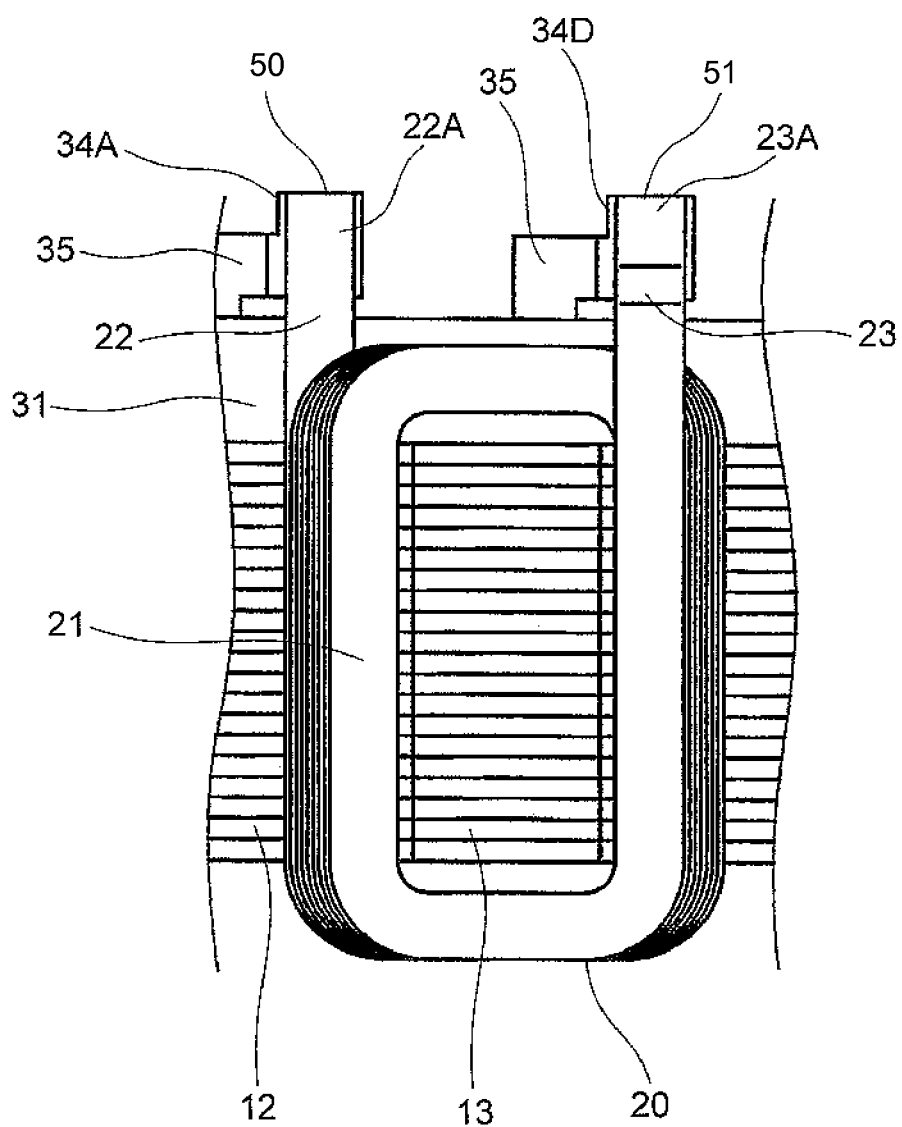
FIG. 2 is a partial front view illustrating the stator illustrated in FIG. 1 as viewed from a direction indicated by the arrow A.
Figure 3:
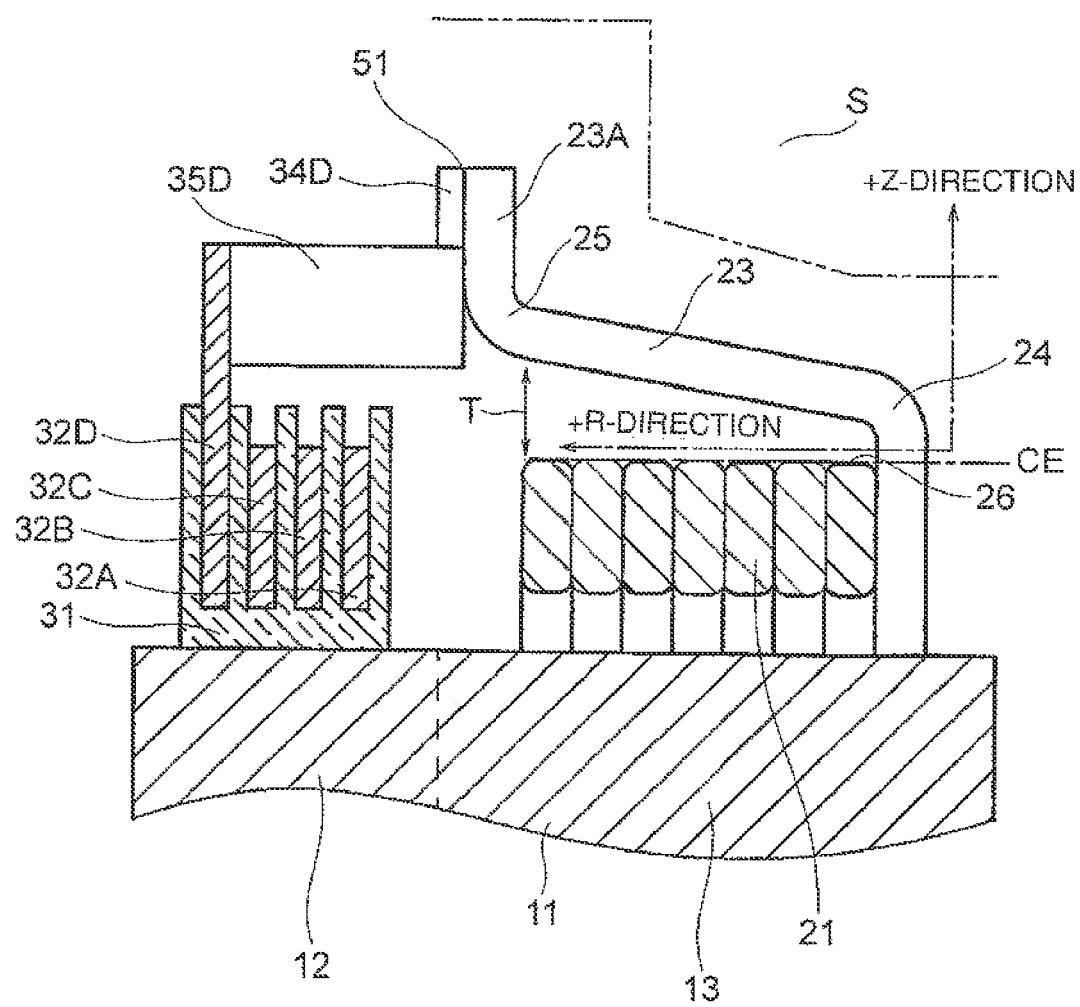
FIG. 3 is a sectional view taken along the line III-III illustrated in FIG. 1 as viewed from a direction indicated by the arrows.
Figure 4:
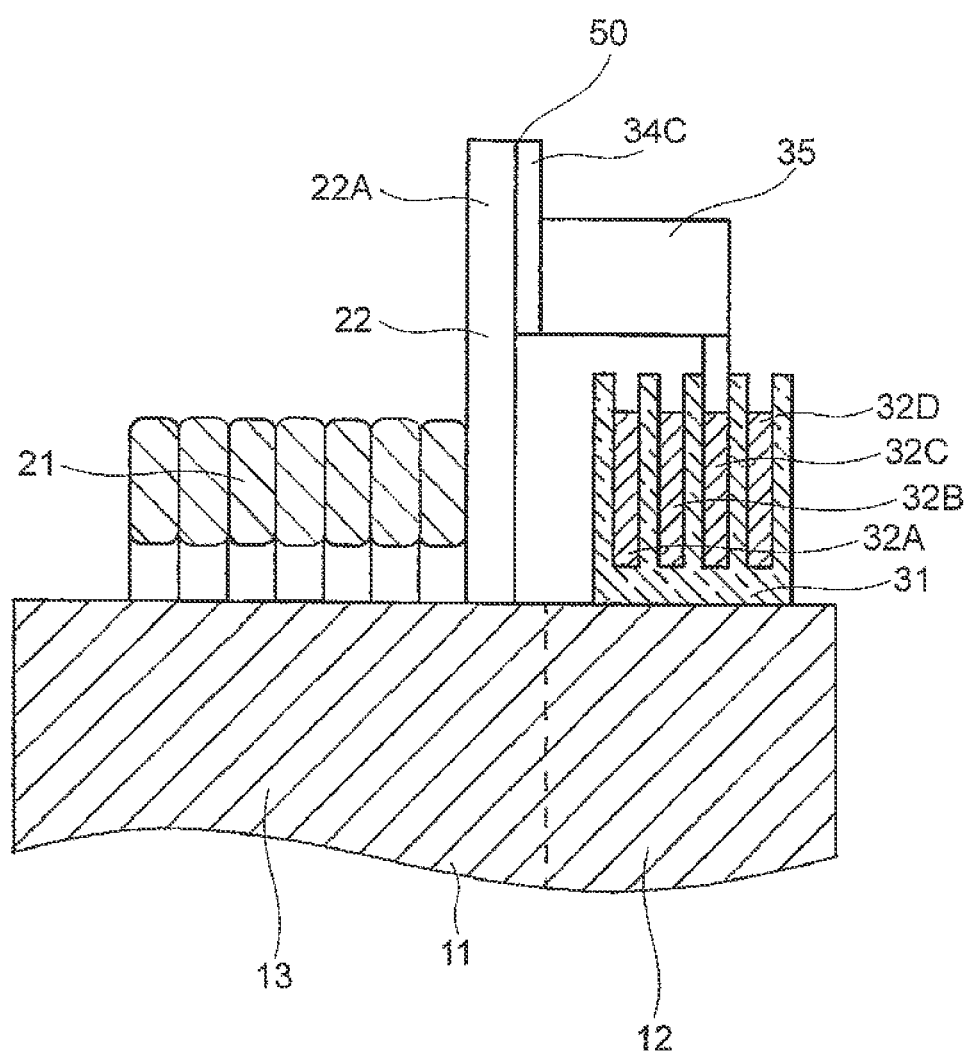
FIG. 4 is a sectional view taken along the line IV-IV illustrated in FIG. 1 as viewed from a direction indicated by the arrows.

FIG. 1 is a partial plan view illustrating a stator 10 for an electric motor which is a rotary electric machine, according to a first embodiment of the present invention, FIG. 2 is a partial front view illustrating the stator 10 illustrated in FIG. 1 as viewed from a direction indicated by the arrow A, FIG. 3 is a sectional view taken along the line III-III illustrated in FIG. 1 as viewed from a direction indicated by the arrows, and FIG. 4 is a sectional view taken along the line IV-IV illustrated in FIG. 1 as viewed from a direction indicated by the arrows.

The stator 10 includes a stator core 11 and a stator winding 20. The stator core 11 has a hollow cylindrical shape and is formed by laminating a plurality of magnetic steel plates. The stator winding 20 is mounted to the stator core 11.

The stator core 11 includes stator-core pieces 11A obtained by dividing the stator core 11 into a plurality of pieces in a circumferential direction. The stator core 11 includes yoke portions 12 and a plurality of teeth 13. The plurality of teeth 13 are formed at equal intervals along the circumferential direction so that distal ends project from the yoke portions 12 to the inner diameter side to form slots 14 therebetween.

The stator core 11 is formed by connecting the adjacent stator-core pieces 11A to each other by welding.

The stator winding 20 includes coil portions having the respective phases, each being formed by winding a conductor around each of the teeth 13, and a wire-connection plate 30 provided on one end surface of the stator core 11 on the outer diameter side, which electrically connects the coil portions to each other.

Each of the coil portions having the respective phases includes a coil main-body portion 21, a first connecting wire 22, and a second connecting wire 23. The first connecting wire 22 is drawn from the coil main-body portion 21 on the outer diameter side of the stator 10. The second connecting wire 23 is drawn from the inner diameter side of the stator 10.

As can be seen from FIGS. 3 and 4, each of the conductors has a rectangular cross section.

Each of the coil portions is a so-called edgewise coil which is formed by spirally winding the conductor so that one of short sides of the rectangular cross section of the conductor is located on the inner side and a pair of long sides becomes perpendicular to an axis of winding (radial direction of the stator core 11).

Each of the coil portions is formed by winding the conductor so that a diameter of the coil portion becomes gradually smaller from the outer diameter side to the inner diameter side in accordance with a shape of each of the teeth 13, which is tapered toward a distal end.

Moreover, the coil main-body portion 21 of each of the coil portions includes the conductor wound on a corresponding one of the teeth 13 in a single layer.

The coil portions may be assembled to the stator core 11 in a stage in which the stator core 11 is in the form of the stator core pieces 11A. Alternatively, after the adjacent stator core pieces 11A are connected to each other by welding to be formed into the ring-like shape, each of the coil portions may be assembled to a corresponding one of the teeth 13 from the inner diameter side of the stator core 11.

The wire-connection plate 30 includes an insulating case 31 including a U-phase groove, a W-phase groove, a V-phase groove, and a neutral-point groove, and a U-phase terminal member 32A, a V-phase terminal member 32B, a W-phase terminal member 32C, and a neutral-point terminal member 32D which are to be inserted into the respective grooves. The insulating case 31 is formed to have a ring-like shape along the entire circumference of the end surface of the stator core 11 on one side. Each of the terminal members 32A, 32B, 32C, and 32D is formed of an elongated plate-like conductive material.

The terminal member 32A includes a terminal-member main body portion 33A inserted into a corresponding one of the grooves of the insulating case 31, terminal-member end portions 34A formed on both ends, and a connection portion 35A for connecting the terminal-member end portions 34A and the terminal member main-body portion 33A to each other. Similarly, the terminal member 32B includes a terminal-member main body portion 33B, terminal-member end portions 34B, and a connection portion 35B, the terminal member 32C includes a terminal-member main body portion 33C, terminal-member end portions 34C, and a connection portion 35C, and the terminal member 32D includes a terminal-member main body portion 33D, terminal-member end portions 34D, and a connection portion 35D.

The terminal-member end portions 34A, 34B, 34C, and 34D are electrically connected to first connecting-wire end portions 22A of the first connecting wires 22 of the coil portions and second connecting-wire end portions 23A of second connecting wires 23 of the coil portions. Moreover, as can be seen from FIGS. 3 and 4, the terminal-member end portions 34A, 34B, 34C, and 34D are located on the inner diameter side of the insulating case 31.

The coil portions having the respective phases are electrically connected in parallel and in a Y-connection configuration.

As illustrated in FIG. 3, each of the second connecting wires 23 drawn from the inner diameter side of the stator core 11 projects from an inner-diameter side end portion of the coil portion main-body portion 21 outward in an axial direction of the stator core 11. The second connecting wire 23 is bent at a first bent portion 24 toward the outer diameter side of the stator core 11, subsequently extends outward obliquely in the radial direction of the stator core 11, and is further bent outward in the axial direction of the stator core 11 at a second bent portion 25. At the first bent portion 24 and the second bent portion 25, the long sides of the cross section of the conductor are bent.

Here, the long sides of the cross section of the conductor are bent at the first bent portion 24 and the second bent portion 25. Therefore, a force required for the bending is small, thereby providing good productivity.

Moreover, a stress applied to the conductor is advantageously small. Therefore, high reliability is provided.

Further, a difference in curvature is small between the inner side and the outer side of each of the bent portions 24 and 25, thereby having less peel off of an insulating coating of the conductor. Therefore, high reliability is provided.

Further, the conductor has the rectangular end surface. As compared with a conductor having a circular cross section, which is wound with the same number of turns, a sectional area of the conductor can be increased while clearances between the conductors and between the conductor and the teeth 13 can be reduced. Therefore, the amount of heat generation of the conductor with respect to the same current can be reduced to improve heat-radiation performance to the stator core 11. As a result, cooling performance for the electric motor can be improved.

The second connecting-wire end potions 23A of the second connecting wires 23 are superimposed so as to be held in surface contact with the terminal-member end portions 34A, 34B, 34C, and 34D of the respective terminal members 32A, 32B, 32C, and 32D, which extend in the same direction as the second connecting-wire end portions 23A, in a state in which the second connecting-wire end portions 23A extend in a direction away from the end surface of the stator core 11 in the axial direction. Then, each of the second connecting-wire end portions 23A is connected by welding to a corresponding one of the one terminal-member end portions 34A, 34B, 34C, and 34D at a second bonded portion 51.

As described above, the second connecting-wire end portions 23A of the second connecting wires 23 drawn from the inner diameter side of the stator core 11 are held in surface contact with the one terminal-member end portions 34A, 34B, 34C, and 34D of the terminal members 32A, 32B, 32C, and 32D. Accordingly, the connection is facilitated to improve the productivity. In addition, the second connecting wires 23 and the terminal members 32A, 32B, 32C, and 32D can be bonded to each other by welding at the second bonded portion 51.

Each of the second connecting wires 23 drawn from the inner diameter side of the stator core 11 includes the first bent portion 24 and the second bent portion 25. The second connecting wires 23 are respectively connected to the terminal members 32A, 32B, 32C, and 32D. Therefore, the stress generated in the second bonded portions 51, in which the terminal-member end portions 34A, 34B, 34C, and 34D and the second connecting-wire end portions 23A of the second connecting wires 23 of the coil portions are connected, due to vibrations and thermal shock, can be reduced. Therefore, the reliability and durability of the electric motor are improved.

Moreover, each of the connecting wires 23 is configured so that a clearance T from a coil end CE of the coil main-body portion 21 becomes larger toward the outer diameter side of the stator core 11.

Specifically, each of the second connecting wires 23 is configured so that a differential value of a length (z) of the second connecting wire 23 in the axial direction of the stator 10 to a length (r) of the second connecting wire 23 in the radial direction of the stator 10 becomes: $\Delta z/\Delta r > 0$.

Here, when the radial direction of the stator core 11 is an R-axis and the axial direction of the stator core 11 is a Z-axis, the radial direction of the stator core 11 toward the outer diameter side is defined as a +R-direction and the axial direction of the stator core 11 away from the end surface of the stator core 11 is defined as a +Z-direction.

Figure 5:
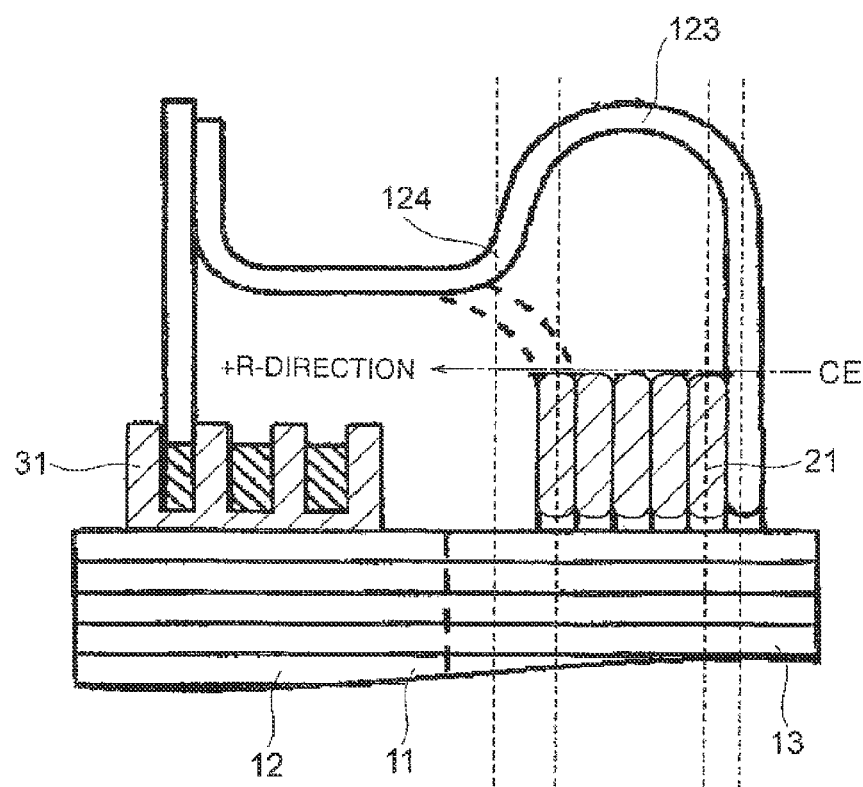
FIG. 5 is a diagram illustrating the relationship between a potential difference and an electric field intensity between a second connecting wire and the coil end CE of the coil main-body portion, and the position in the radial direction of the stator (position in the R-direction), of a conventional example.

FIG. 5 is a diagram illustrating the relationship between a potential difference and an electric field intensity between a second connecting wire 123 and the coil end CE of the coil main-body portion 21, and the position in the radial direction of the stator 10 (position in the R-direction), of a conventional example.

Figure 6:
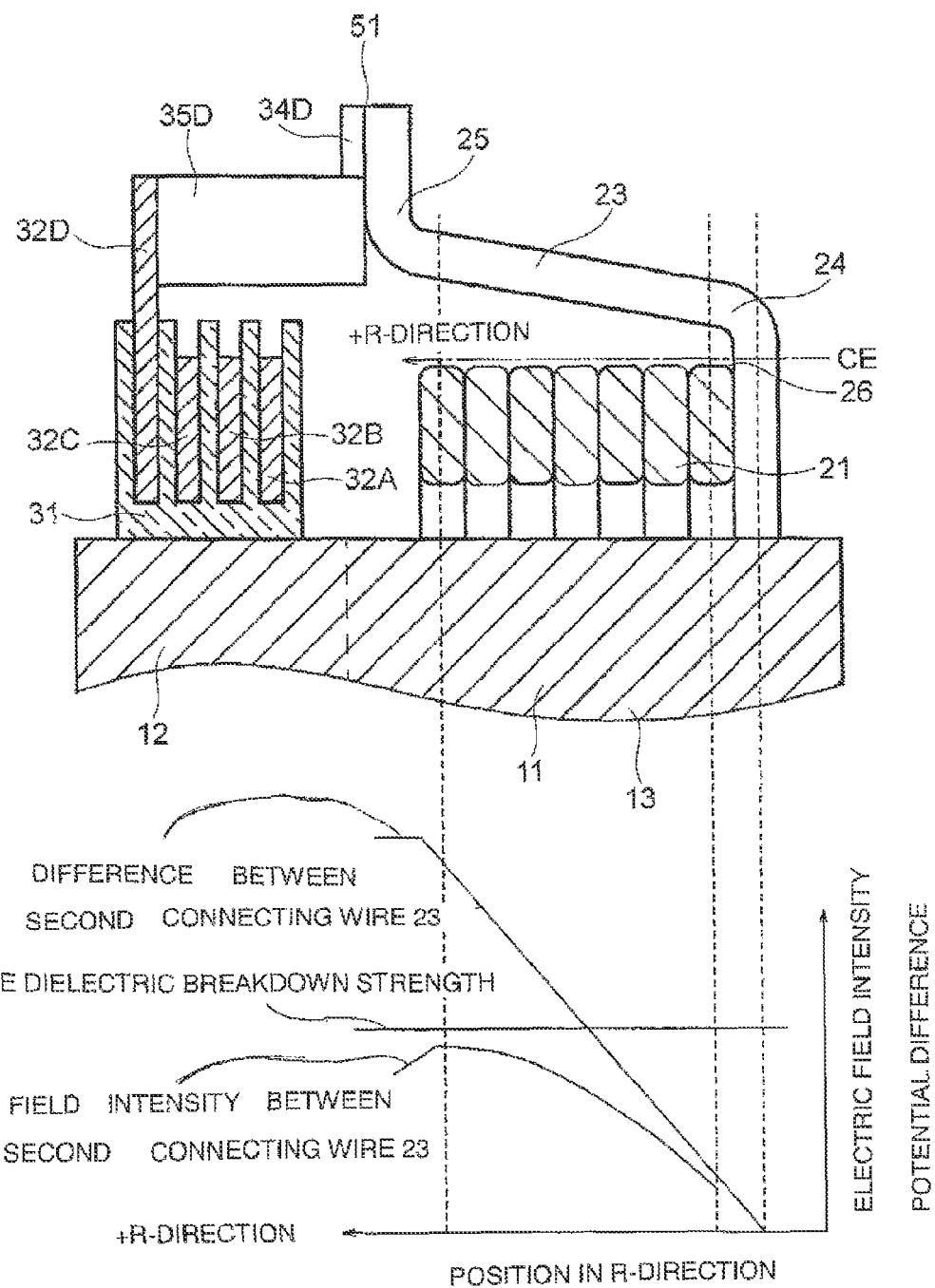
FIG. 6 is a diagram illustrating the relationship between the potential difference and the electric field intensity between the second connecting wire and the coil end CE of the coil main-body portion, and the position in the radial direction of the stator (position in the R-direction) according to this embodiment.

FIG. 6 is a diagram illustrating the relationship between the potential difference and the electric field intensity between the second connecting wire 23 and the coil end CE of the coil main-body portion 21, and the position in the radial direction of the stator 10 (position in the R-direction) according to this embodiment.

Here, the electric field intensity is a value obtained by dividing the potential difference by the distance between the second connecting wire 123 and the coil main-body portion 21 in the Z direction at a point at which the positions in the R-direction are the same.

In the case of the second connecting wire 23 illustrated in FIG. 6, the electric field intensity proportionally increases toward the outer side in the radial direction within a region of the coil main-body portion 21.

The potential of the second connecting wire 123 in the conventional example is approximately the same as that in an innermost-diameter portion of the coil main-body portion 21. However, the potential difference between the second connecting wire 123 and the coil main-body portion 21 becomes larger as the position on the second connecting wire 123 moves toward the outer diameter side (+R-direction).

The second connecting wire 123 includes a concave bent portion 124 which is recessed in a direction closer to the end surface of the stator core 11. At the concave bent portion 124, the potential difference between the second connecting wire 123 and a portion of the coil main-body portion 21 on the outermost diameter side becomes maximum. In addition, at the bent portion 124, the second connecting wire 123 has the smallest distance from the coil main-body portion 21.

Therefore, in order to ensure an allowable dielectric breakdown strength between the second connecting wire 123 and the outermost-diameter portion of the coil main-body portion 21, it is necessary to ensure a predetermined or longer distance between the bent portion 124 of the second connecting wire 123 and the coil end CE.

Therefore, although a sufficiently large allowable dielectric breakdown strength is provided between the second connecting wire 123 and the portion of the coil main-body portion 21 on the inner diameter side, the second connecting wire 123 bulges outward in the axial direction of the stator 10.

On the other hand, in the case of the stator 10 of this embodiment, each of the connecting wires 23 is configured so that the differential value of the length (z) of the second connecting wire 23 in the axial direction of the stator 10 to the length (r) of the second connecting wire 23 in the radial direction of the stator 10 becomes: $\Delta z/\Delta r > 0$.

Therefore, the potential difference between the second connecting wire 23 and the outermost-diameter portion of the coil main-body portion 21 becomes maximum. However, if the distance between the second bent portion 25 of the second connecting wire 23 and the coil main-body portion 21 is ensured so as to achieve the allowable dielectric breakdown strength, the electric field intensity between the second connecting wire 23 and the coil main-body portion 21 becomes smaller toward the inner diameter side of the coil-main body portion 21. Accordingly, the allowable dielectric breakdown strength can be ensured even between the second bent portion 25 and the first bent portion 24.

Specifically, in comparison with the conventional example, the second connecting wire 23 can be provided so as to be located closer to the coil main-body portion 21. Therefore, the second connecting wire 23 can be prevented from interfering with, for example, a component such as a magnetic-pole position detection sensor, which is provided on the outer side of the stator 10 in the radial direction (in a space S illustrated in FIG. 3).

Moreover, the second connecting wire 23 includes the first bent portion 24 which is formed at the position away from the innermost diameter portion of the coil main-body portion 21 in the direction vertical to the end surface of the stator core 11. Therefore, the second connecting wire 23 can be prevented from interfering with a corner portion 26 at which the end surface of the coil end CE and the inner diameter surface of the coil main-body portion 21 intersect.

Moreover, first connecting-wire end portions 22A provided at the distal ends of the first connecting wires 22, which are linearly drawn outward from the outermost diameter portions of the coil portions in the axial direction of the stator core 11, are superimposed on the another terminal-member end portions 34A, 34B, 34C, and 34D which extend in the same direction as the first connecting wires 22. The first connecting-wire end portions 22A of the first connecting wires 22 and the another terminal-member end portions 34A, 34B, 34C, and 34D are connected by welding at first bonded portions 50.

The first bonded portions 50, in which the first connecting-wire end portions 22A of the first connecting wires 22 and the one terminal-member end portions 34A, 34B, 34C, and 34D are connected, and the second bonded portions 51, in which the second connecting-wire end portions 23A of the second connecting wires 23 and the another terminal-member end portions 34A, 34B, 34C, and 34D are connected, are provided on approximately the same circumference, as can be seen from FIG. 1.

As described above, by providing the bonded portions 50 and 51 on approximately the same circumference, the first connecting wires 22 and the second connecting wires 23, and the terminal-member end portions 34A, 34B, 34C, and 34D can be bonded by rotating the stator 10 about the axis line of the stator 10. As a result, the productivity is improved.

When the electric motor is set to have specifications for a large output and high-speed rotation, it is generally necessary to reduce the number of turns of the conductor and to allow a large current at several hundreds of amperes to flow. Therefore, when the coil portions inserted over the respective teeth are connected in series, the stator winding is required to be formed of a thick conductor having a large cross section. Thus, it is difficult to process the windings.

On the other hand, in this embodiment, the coil portions having the respective phases are electrically connected in parallel. Therefore, the sectional area of the conductor can be reduced. Thus, good workability for the coil portions is provided.

Moreover, when the thick conductor is used to be wound in a large number of layers, the clearance between the layers becomes large, thereby lowering the heat-radiation property of the coil portions.

On the other hand, in this embodiment, the conductor is spirally wound around each of the teeth 13 in the single layer. Therefore, no clearance is formed between the layers. As a result, the heat-radiation property of the coil portion to the periphery is improved, thereby improving the cooling performance for the electric motor.

Moreover, the coil portions inserted over the respective teeth 13 are connected in parallel. Further, the conductor is wound around each of the teeth 13 in the single layer. Therefore, the potential difference between the inner diameter side and the outer diameter side of each of the coil portions becomes larger.

In this embodiment, each of the connecting wires 23 is configured so that the differential value of the length (z) of the second connecting wire 23 in the axial direction of the stator 10 to the length (r) of the second connecting wire 23 in the radial direction of the stator 10 becomes: $\Delta z/\Delta r > 0$. The effects obtained by the configuration as described above, for ensuring the space on the inner diameter side of the coil end CE and on the outside in the axial direction while keeping the dielectric distance corresponding to the potential difference, become greater. Therefore, the above-mentioned configuration is suitable.

As can be understood from the description given above, the electric motor including the stator 10 according to this embodiment can be designed to have the specifications for a large output and high-speed rotation.

Next, a method for manufacturing the coil portions, each having the above-mentioned configuration, is described.

Figure 7:
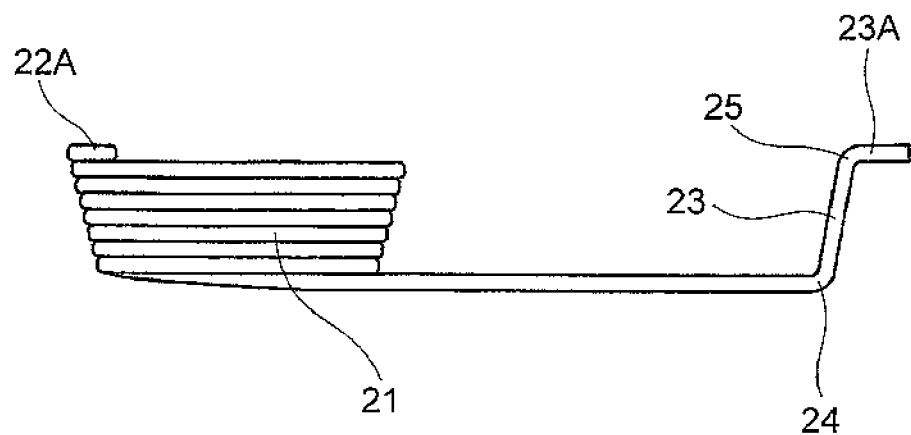
FIG. 7 is a side view illustrating the coil portion in the middle of a manufacturing process.
Figure 8:
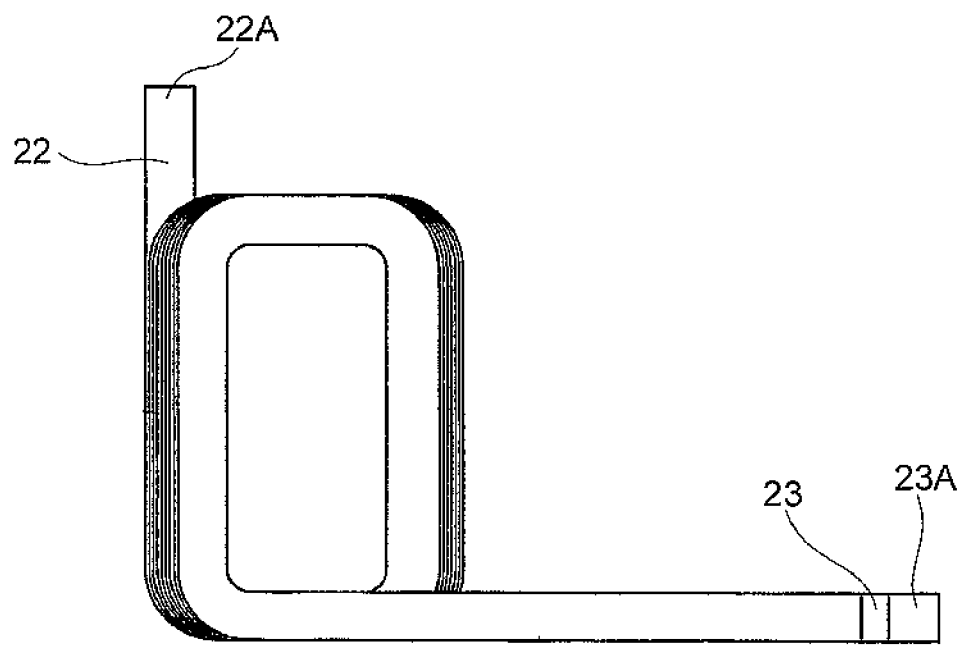
FIG. 8 is a front view of the coil portion illustrated in FIG. 7.
Figure 9:
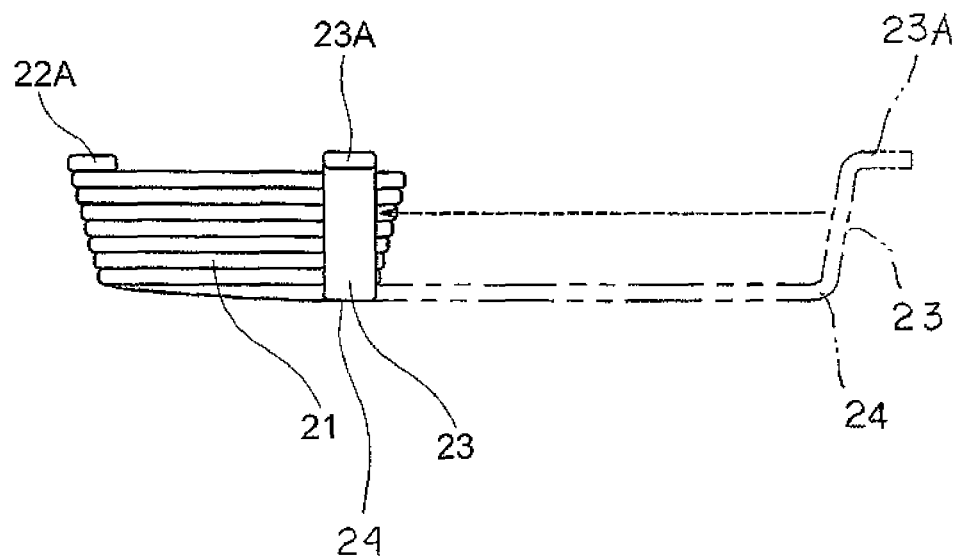
FIG. 9 is a side view of the coil portion when the coil portion is to be inserted over a corresponding one of the teeth.
Figure 10:
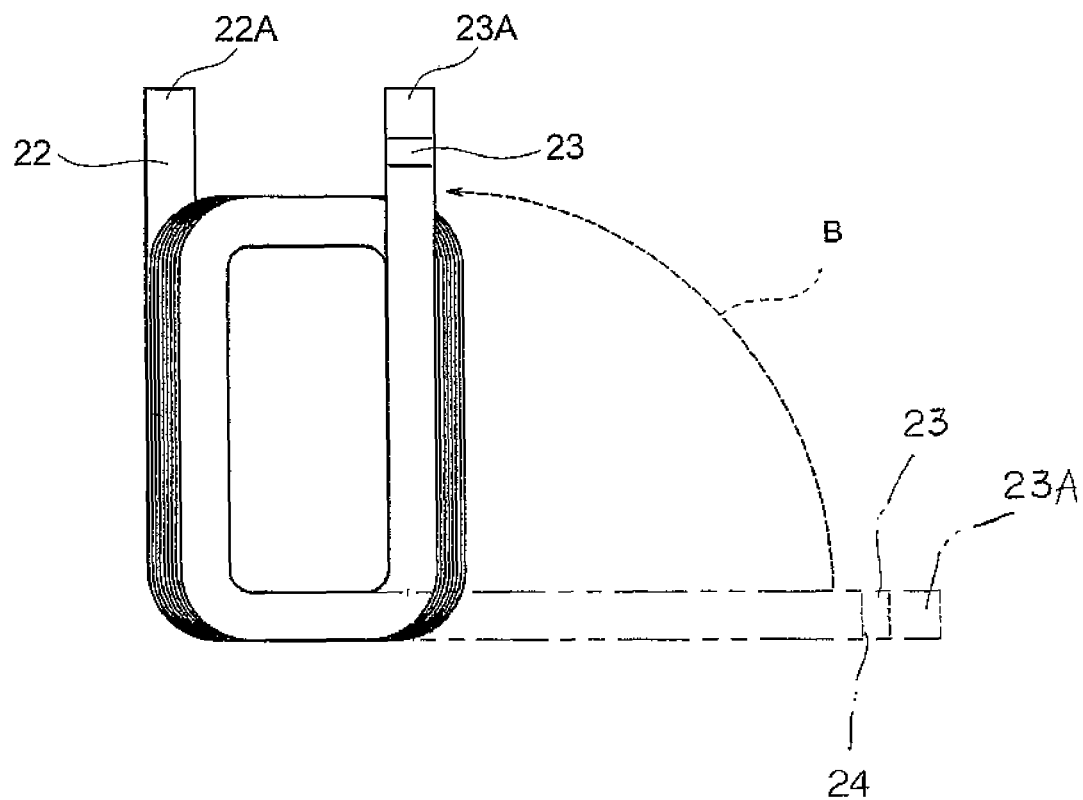
FIG. 10. is a front view illustrating the coil portion illustrated in FIG. 9.

FIG. 7 is a side view illustrating the coil portion in the middle of a manufacturing process, FIG. 8 is a front view of the coil portion illustrated in FIG. 7, FIG. 9 is a side view of the coil portion when the coil portion is to be inserted over a corresponding one of the teeth 13, and FIG. 10. is a front view illustrating the coil portion illustrated in FIG. 9.

First, the end of the conductor having the rectangular cross section is bent so as to form the second connecting wire 23 having the first bent portion 24 and the second bent portion 25.

Thereafter, the conductor is spirally wound with one of the short sides being located on the inner side to form the coil main-body portion 21.

As the final step, the conductor is plastically deformed in a direction indicated by the arrow B shown in FIG. 10 with one of the short sides being located on the inner side. As a result, the coil portion to be inserted over each of the teeth 13 so that the second connecting wire 23 extends so as to be overlapped with the coil main-body portion 21 in the axial direction and the first connecting-wire end portion 22A of the first connecting wire 22 and the second connecting-wire end portion 23A of the second connecting wire 23 extend in the same direction is formed.

The second bent portion 25 may be formed after the formation of the coil main-body portion 21.

In this embodiment, before the coil portion is inserted over each of the teeth 13 of the stator core 11, the coil portion is bent so that the coil main-body portion 21 and the second connecting wire 23 overlap with each other as viewed from the radial direction.

Therefore, a step of bending the second connecting wire 23 drawn from the inner diameter side of the stator core 11 to the outer diameter side after the coil main-body portion 21 is inserted over each of the teeth 13 of the stator core 11 is not required. In addition, a space for installing a tool for bending the second connecting wire 23 to the outer diameter side is not required, thereby improving the productivity.

Moreover, the end portions 23A of the second connecting wires 23 to be connected to the terminal-member end portions 34A, 34B, 34C, and 34D can be easily located at predetermined positions.

Further, when the second connecting-wire end portions 23A of the second connecting wires 23 and the terminal-member end portions 34A, 34B, 34C, and 34D are bonded by welding, the stress generated by springback of the second connecting wires 23 is not applied to the terminal-member end portions 34A, 34B, 34C, and 34D. Therefore, a predetermined strength is ensured at the second bonded portion 51. As a result, the reliability and durability of the electric motor are improved.

Further, the first bent portion 24 and the second bent portion 25 of each of the second connecting wires 23 are previously formed before the coil portion is inserted over each of the teeth 13 of the stator core 11. Therefore, during the step of forming the first bent portion 24 and the second bent portion 25, each of the second connecting wires 23 does not interfere with the first connecting wire 22. Therefore, the manufacturing of the coil portions is easy.

Second Embodiment

Figure 11:
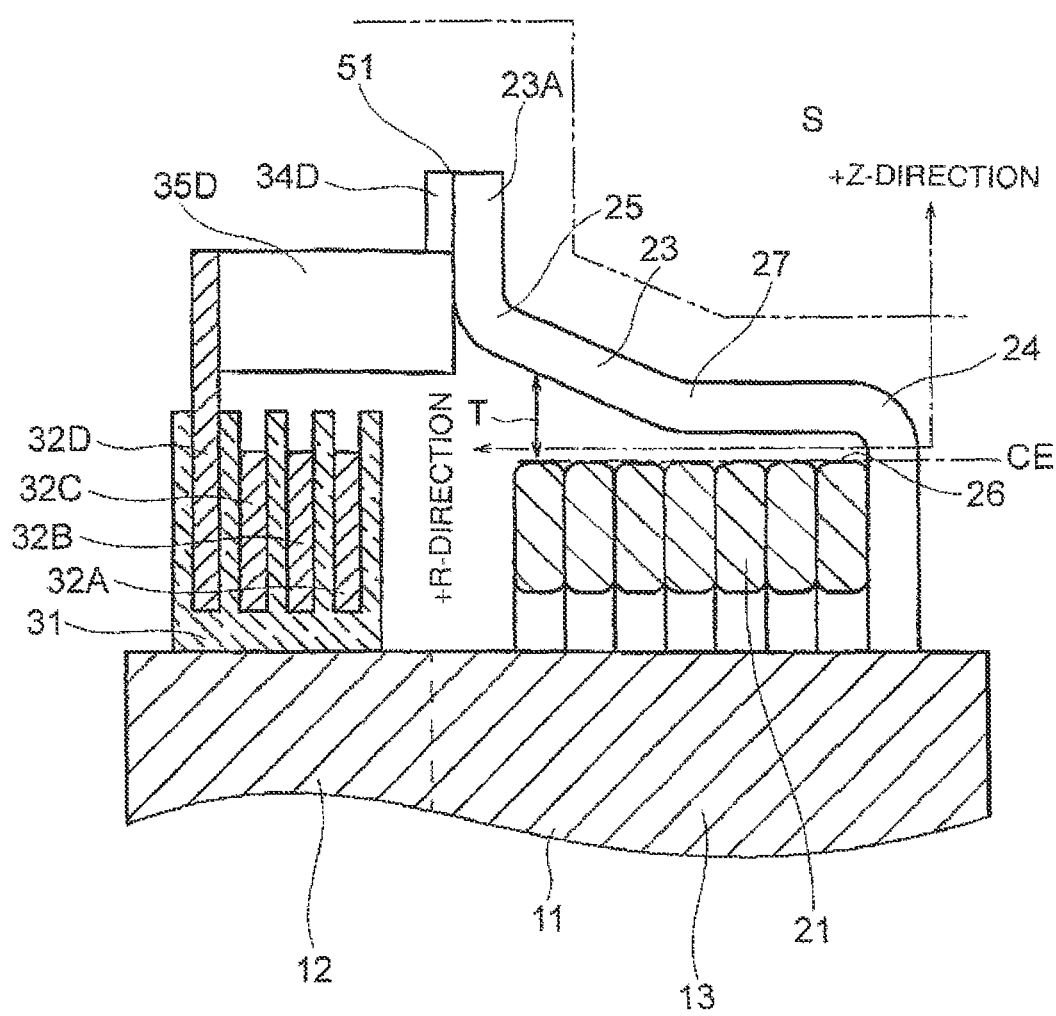
FIG. 11 is a sectional side view illustrating a principal part of the stator according to a second embodiment of the present invention.
Figure 12:
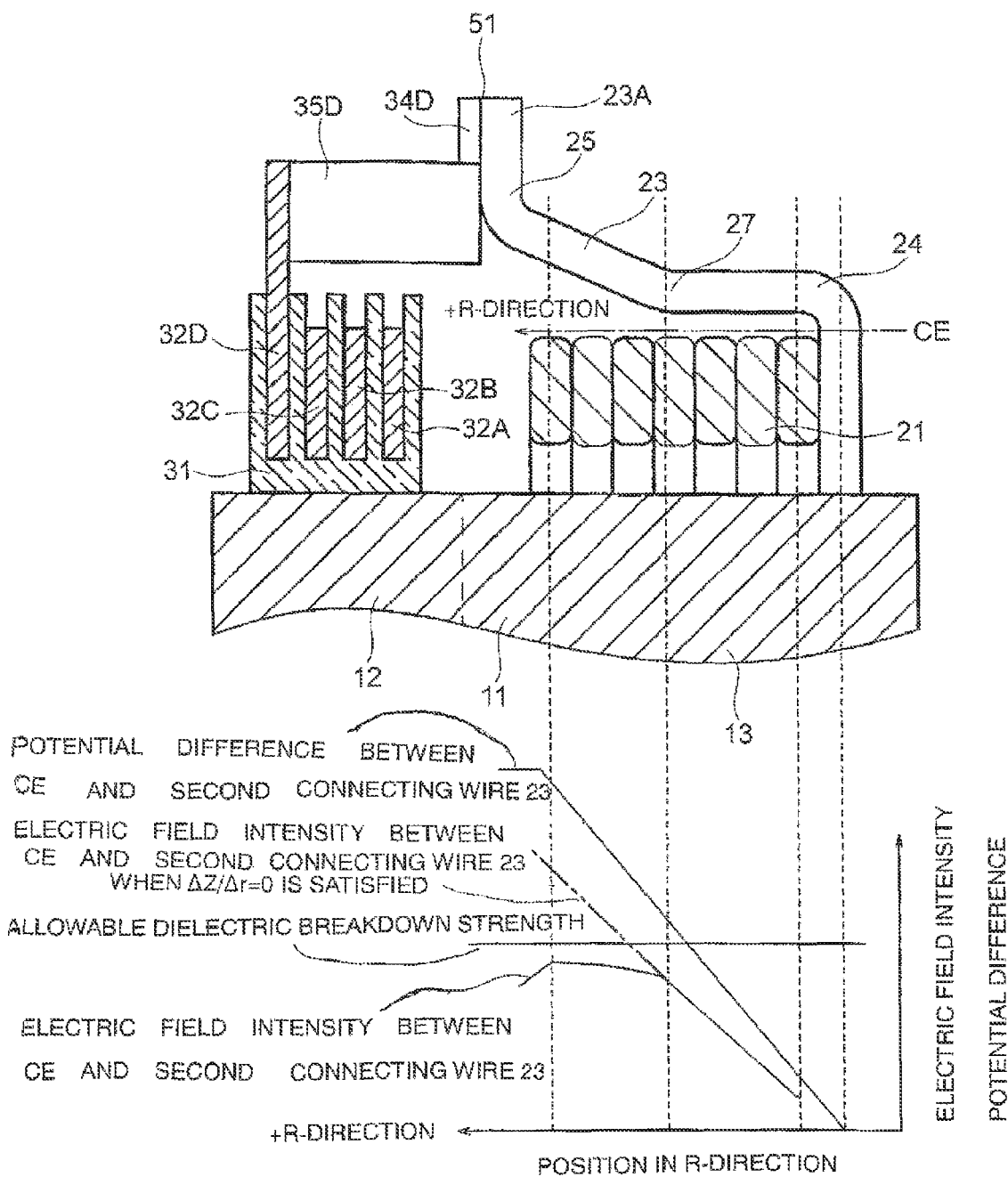
FIG. 12 is a diagram illustrating the relationship between the potential difference and the electric field intensity between the second connecting wire and the coil end CE of the coil main-body portion illustrated in FIG. 11, and the position in the radial direction of the stator (position in the R-direction)

FIG. 11 is a sectional side view illustrating a principal part of the stator 10 according to a second embodiment of the present invention, and FIG. 12 is a diagram illustrating the relationship between the potential difference and the electric field intensity between the second connecting wire 23 and the coil end CE of the coil main-body portion 21 illustrated in FIG. 11 and the position in the radial direction of the stator 10 (position in the R-direction).

In this embodiment, each of the second connecting wires 23 includes a third bent portion 27 formed between the first bent portion 24 and the second bent portion 25.

The first bent portion 24 is bent so that a portion of the second connecting wire 23 between the first bent portion 24 and the third bent portion 27 has approximately the same height based on the end surface of the stator core 11 as a reference.

The third bent portion 27 is configured so that the clearance T between the third bent portion 27 and the coil end CE of the coil main-body portion 21 become larger along a portion of the second connecting wire 23 from the third bent portion 27 to the second bent portion 25.

The remaining configuration is the same as that of the stator 10 of the first embodiment.

In this embodiment, each of the second connecting wires 23 is configured so that a differential value of the length (z) in the axial direction of the stator 10 to the length (r) in the radial direction of the stator 10 becomes Δz/Δr=0 for the portion between the first bent portion 24 and the third bent portion 27 and the differential value becomes Δz/Δr>0 for the portion between the third bent portion 27 and the second bent portion 25.

In the case where Δz/Δr=0 is satisfied, the potential difference between the coil main-body portion 21 and the second connecting wire 23 become larger toward the outer diameter side of the stator 10. Therefore, if the clearance T between the second connecting wire 23 and the coil end CE of the coil main-body portion 21 is not set sufficiently large, the electric field intensity adversely exceeds the allowable dielectric breakdown strength on the outer diameter side of the coil main-body portion 21 as indicated by the two-dot chain line shown in FIG. 12.

The electric field intensity between the portion of the second connecting wire 23 located between the first bent portion 24 and the third bent portion 27 and the coil main-body portion 21 increases with an increase in the potential difference between the coil main-body portion 21 and the second connecting wire 23.

On the other hand, the clearance T between the portion of the second connecting wire 23 located between the third bent portion 27 and the second bent portion 25 and the second connecting wire 23 and the coil end CE of the coil main-body portion 21 is configured to be larger. Therefore, a gradient of the increase in the electric field between the portion of the second connecting wire 23 between the third bent portion 27 and the second bent portion 25 and the coil main-body portion 21 becomes smaller than that between the first bent portion 23 and the third bent portion 27.

In this embodiment, the distance between the second connecting wire 23 and the coil end CE of the coil main-body portion 21 is ensured so that the electric field intensity between the second connecting wire 23 and the outer diameter side of the coil main-body portion 21 satisfies the allowable dielectric breakdown strength. The second connecting wire 23 is provided so that the third bent portion 27 is located lower than the second bent portion 25 based on the end surface of the stator core 11 as the reference.

Moreover, the portion of the second connecting wire 23 located between the first bent portion 24 and the third bent portion 27 is configured so as to be located at approximately the same height based on the end surface of the stator core 11 as the reference. Therefore, the space on the inner diameter side of the second connecting wire 23 and on the outer side in the radial direction increases as compared with the stator 10 according to the first embodiment.

Figure 13:
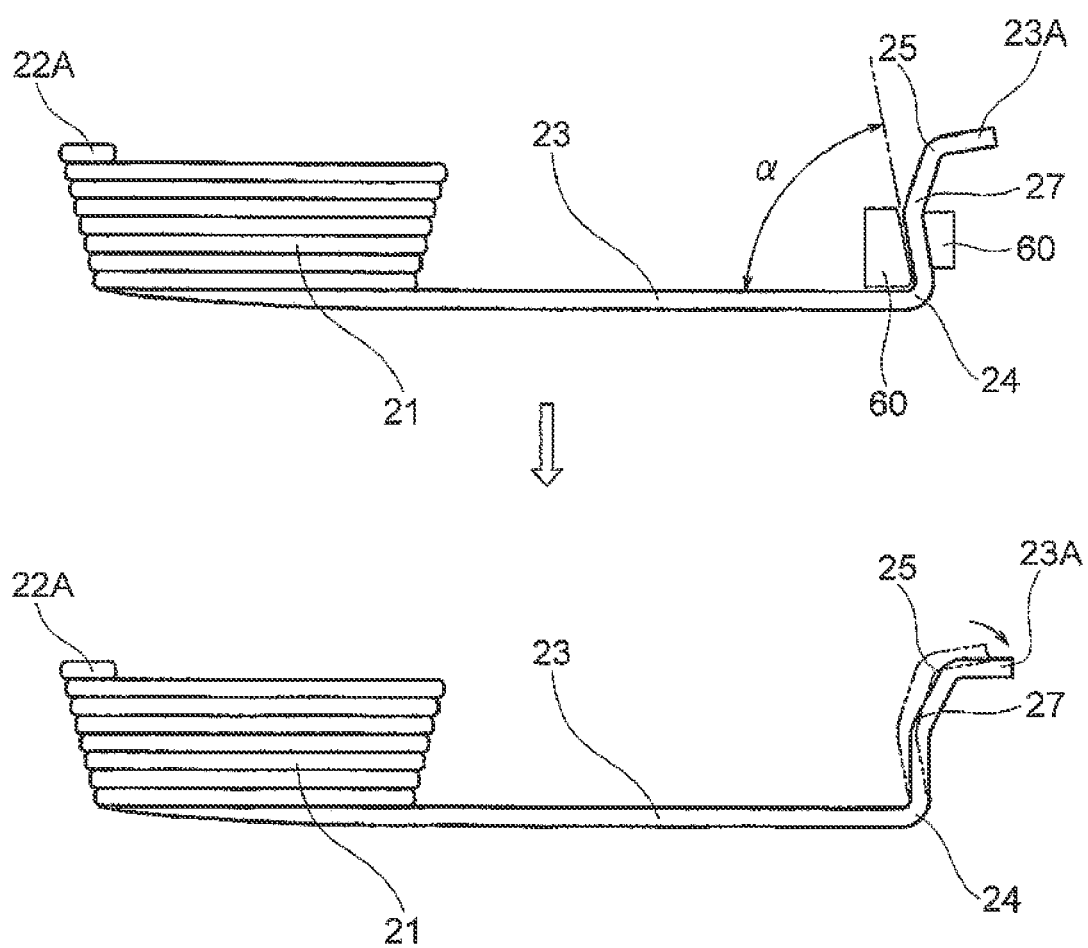
FIG. 13 is a side view illustrating the coil portion in the middle of the manufacturing process.

FIG. 13 is a side view illustrating the coil portion in the middle of the manufacturing process.

In the second embodiment, the portion of the second connecting wire 23 between the first bent portion 24 and the third bent portion 27 is bent at the first bent portion 24 so as to have approximately the same height based on the end surface of the stator core 11 as the reference. Specifically, the second connecting wire 23 is bent at about 90 degrees at the first bent portion 24.

When the first bent portion 24 is manufactured by bending the second connecting wire 23 at about 90 degrees, the second connecting wire 23 is bent toward the coil main-body portion 21 at the first bent portion 24 so that a bending angle α at the time of a bending process (while a tool 60 for bending process is held in contact with the second connecting wire 23) becomes acute, that is, 90 degrees or smaller, and then the bending angle becomes approximately 90 degrees by springback of the first bent portion 24 at the time of completion of the bending process (after the tool 60 for bending process moves away from the coil).

When the first bent portion 24 is configured with the bending angle of 90 degrees, the second connecting wire 23 is required to be bent so that the bending angle α of the second connecting wire 23 becomes acute, that is, 90 degrees or smaller while the tool 60 for bending process is held in contact with the second connecting wire 23 because of the springback of the second connecting wire 23 (in particular, when the second connecting wire 23 to be bent has a large sectional area).

When the first bent portion 24 is desired to be formed at the bending angle of 90 degrees after the coil portion is inserted over each of the teeth 13 of the stator core 11, the distance for allowing the second connecting wire 23 to be bent from the coil end CE at the acute angle of 90 degrees or smaller is required. Therefore, it is necessary to ensure the space for providing the second connecting wire 23 on the inner diameter side of the coil end CE on the outer side in the axial direction.

In the second embodiment, however, the second connecting wire 23 is bent toward the coil main-body portion 21 in the middle of the manufacturing process of the coil portion. Therefore, even if the bending angle α at the time of the bending process (while the tool 60 for bending process is held in contact with the second connecting wire 23) is set to be acute, that is, 90 degrees or smaller, for the first bent portion 24 of the second connecting wire 23, the first bent portion 24 does not interfere with the coil end CE. Accordingly, the second connecting wire 24 is not required to be located at a distance from the coil end CE.

Thus, the space on the inner diameter side of the coil end CE on the outer side in the axial direction is not required to be ensured. Therefore, the height of the second connecting wire 23 present on the inner diameter side of the stator core 11 on the outer side in the axial direction of the coil end CE based on the end surface of the stator core 11 as the reference can be reduced.

Third Embodiment

Figure 14:
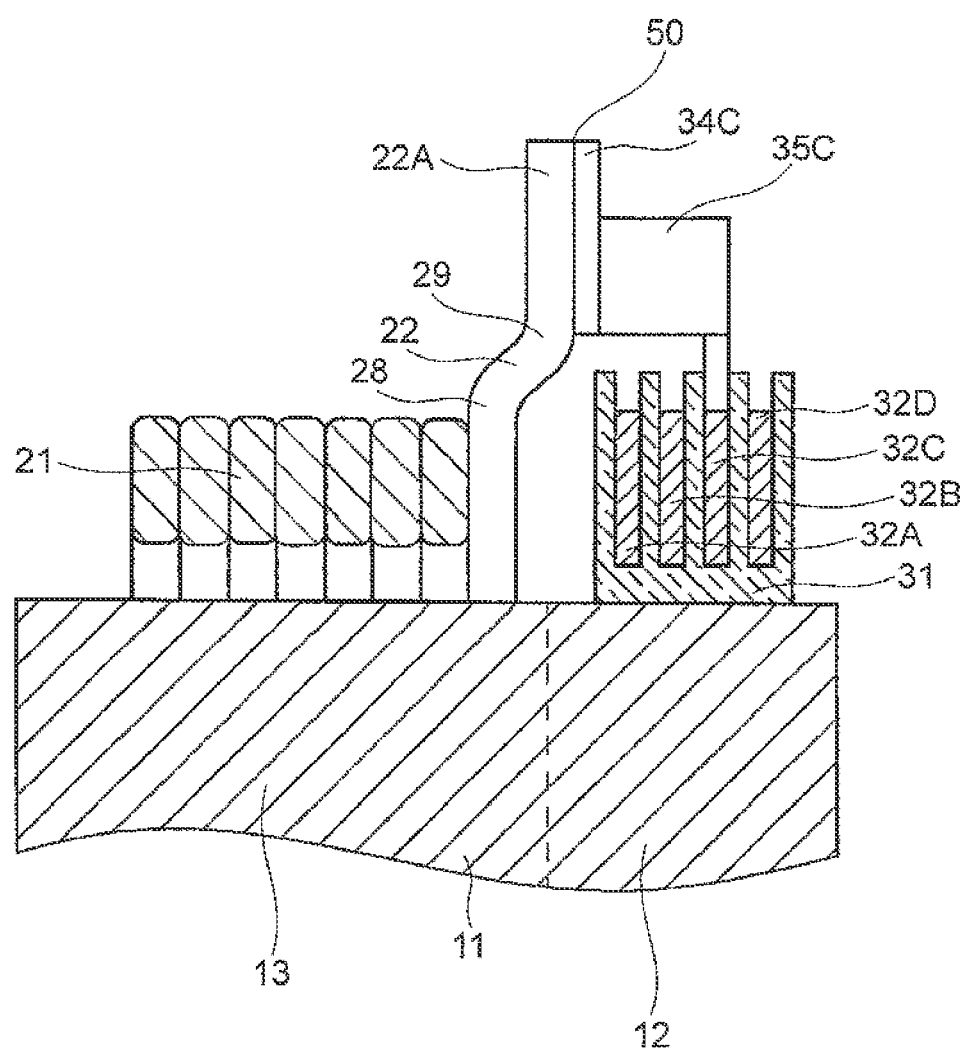
FIG. 14 is a sectional view illustrating a principal part of the stator according to a third embodiment of the present invention.

FIG. 14 is a sectional view illustrating a principal part of the stator 10 according to a third embodiment of the present invention.

In the third embodiment, the first connecting wire 22 drawn from the outer diameter side of the stator core 11 projects from the outer-diameter side end portion of the coil main-body portion 21 outward in the axial direction of the stator core 11. The first connecting wire 22 is then bent to the outer diameter side of the stator core 11 at a first bent portion 28, then extends outward in the radial direction of the stator core 11, and is bent again outward in the axial direction of the stator core 11 at a second bent portion 29.

The remaining configuration is the same as that of the stator 10 according to the first embodiment.

In the third embodiment, the first connecting wire 22 is also provided with the first bent portion 28 and the second bent portion 29 so that the first connecting wire 22 is formed to have a crank-like shape. As a result, a stress, which is generated in first bonded portions 50, in which the first connecting-wire end portions 22A of the first connecting wires 22 and the terminal-member end portions 34A, 34B, 34C, and 34D are connected, due to vibrations or a thermal shock, can be reduced. Therefore, the reliability and durability of the electric motor are further improved.

In each of the embodiments described above, the electric motor has been described as a rotary electric machine. However, the present invention is also applicable to a power generator which is a rotary electric machine.

Further, although the coil portion having each of the phases, which constitutes the stator winding 20, is formed by winding the conductor in a concentrated fashion, the coil portion may be formed by winding the conductor in a distributed fashion.

Further, although the coil portions having the respective phases are electrically connected to each other in the Y-connection configuration, the stator winding may be formed by electrically connecting the coil portions having the respective phases to each other in a Δ-connection configuration.

Further, the sectional shape of the conductor is not limited to the rectangle.

What is claimed is:

1. A stator for a rotary electric machine, comprising:
a stator core having a hollow cylindrical shape, including a plurality of slots formed along a circumferential direction by a plurality of teeth, each having a distal end portion projecting to an inner diameter side; and
a stator winding provided to the stator core, including a plurality of coil portions, each including a conductor wound around each tooth of the plurality of teeth, electrically connected to each other through terminal members provided on an outer diameter side of an end surface of the stator core, wherein:
each coil portion of the plurality of coil portions includes: a coil main-body portion; a first connecting wire drawn from an outermost diameter portion of the coil main-body portion; and a second connecting wire drawn from an innermost diameter portion of the coil main-body portion;
the first connecting wire includes a first connecting-wire end portion connected to one terminal-member end portion of a corresponding one of the terminal members;
the second connecting wire includes a first bent portion formed by bending the second connecting wire outward in a radial direction of the stator core and a second connecting-wire end portion connected to another terminal-member end portion of the corresponding one of the terminal members; and
the second connecting wire is configured so that a differential value of a length z in an axial direction of the stator, provided that an axially outward direction is a +-direction, to a length r in a radial direction of the stator, provided that a radially outward direction is a +-direction, is $\Delta z/\Delta r > 0$,
wherein an electric field intensity between the second connecting wire and a coil end of a coil main-body portion proportionally increases toward the outer side in the radial direction within a region of the coil main-body portion,
wherein the second connecting wire has a linearly inclined portion extending from the first bent portion to a second bent portion located at the second connecting-wire end portion, the linear inclined portion extending over the entire axial direction of the coil main-body portion.

2. The stator for a rotary electric machine according to claim 1, wherein:
the plurality of coil portions in the same phase are connected in parallel to each other through the terminal members; and
the each coil portion of the plurality of coil portions is formed by spirally winding the conductor around a corresponding one of the plurality of teeth in a single layer.

3. The stator for a rotary electric machine according to claim 1, wherein the conductor has a rectangular sectional shape and is wound with one of short sides of a cross section of the conductor being located on an inner side so that a pair of long sides becomes vertical to an axis of winding.

4. The stator for a rotary electric machine according to claim 1, wherein the first bent portion of the second connecting wire is formed at a position away from an outermost circumferential surface of the coil main-body portion in the radial direction and is formed at a position lower than a second bonded portion, in which the second connecting-wire end portion of the second connecting wire and a corresponding one of the terminal-member end portions of the terminal members are bonded, based on the end surface of the stator core as a reference.

5. The stator for a rotary electric machine according to claim 1, wherein the first connecting wire extends outward along an axial direction of the stator core and has a crank-like shape with the first bent portion and the second bent portion formed in a middle part.

6. The stator for a rotary electric machine according to claim 1, wherein the first connecting-wire end portion, the second connecting-wire end portion, and both the terminal-member end portions of each of the terminal members all extend along the axial direction of the stator core.

7. The stator for a rotary electric machine according to claim 1, wherein a first bonded portion, in which the first connecting-wire end portion of the first connecting wire and the terminal-member end portions of each of the terminal members are bonded, and a second bonded portion, in which the second connecting-wire end portion of the second connecting wire and the terminal-member end portions of each of the terminal members are bonded, are located on a circumference.

\* \* \* \* \*